(12) United States Patent
Frazier et al.

(10) Patent No.: US 7,893,854 B2
(45) Date of Patent: Feb. 22, 2011

(54) OPTICAL DIGITAL TO ANALOG CONVERTER

(75) Inventors: Gary A. Frazier, Garland, TX (US); Roger K. Lake, Riverside, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 12/507,002

(22) Filed: Jul. 21, 2009

(65) Prior Publication Data
US 2009/0295611 A1 Dec. 3, 2009

Related U.S. Application Data

(63) Continuation of application No. 11/779,710, filed on Jul. 18, 2007, now Pat. No. 7,564,390.

(60) Provisional application No. 60/807,697, filed on Jul. 18, 2006.

(51) Int. Cl.
*H03M 1/00* (2006.01)
(52) U.S. Cl. ........................ 341/137; 341/144
(58) Field of Classification Search ................ 341/144, 341/137; 398/50, 85, 68, 83; 370/222, 223, 370/249, 389, 474; 385/12, 24; 359/248
See application file for complete search history.

(56) References Cited

U.S. PATENT DOCUMENTS

| 5,039,988 | A | * | 8/1991 | Hong | 341/137 |
| 5,119,227 | A | * | 6/1992 | Dawson et al. | 359/244 |
| 5,724,174 | A | * | 3/1998 | Meyer et al. | 359/248 |
| 2007/0159369 | A1 | * | 7/2007 | Currie et al. | 341/144 |

OTHER PUBLICATIONS

European Patent Office, Communication Pursuant to Article 94(3) EPC, Application No. 07 799 667.6-2217, Dated May 7, 2010, 5 pages.

* cited by examiner

*Primary Examiner*—Joseph Lauture
(74) *Attorney, Agent, or Firm*—Baker Botts L.L.P.

(57) ABSTRACT

According to one embodiment of the invention, a digital to analog converter for converting a digital signal to an analog optical signal includes a light source and a plurality optical switches. Each optical switch is responsive to a respective one of a plurality of bits of a digital signal to selectively allow transmission of light from the light source through the switch. The digital to analog converter also includes a light combination system operable to combine the light passed through each of the switches and produce an analog optical signal indicative of the digital signal.

16 Claims, 5 Drawing Sheets

OPTICAL DIGITAL TO ANALOG CONVERTER

RELATED APPLICATIONS

This application is a continuation of application Ser. No. 11/779,710 filed Jul. 18, 2007, entitled "Optical Digital to Analog Converter," which claims priority under 35 U.S.C. §119(e) of U.S. Provisional Application Ser. No. 60/807,697, filed Jul. 18, 2006, and entitled "Optical Digital to Analog Converter."

TECHNICAL FIELD OF THE INVENTION

The present invention relates generally to digital to analog converters and more particularly to an optical digital to analog converter.

BACKGROUND OF THE INVENTION

Digital electronics is pervasive in today's society. It is often necessary, however, to represent a digital signal in analog form. Further, optical data processing is becoming increasingly prevalent. Traditional digital to analog converters use switch electronic currents or voltage sources to convert a digital code word into an analog value. Example approaches include parallel, or flash, and delta-sigma digital to analog converters. These devices are traditionally noisy due to current crosstalk, power supply noise, and low switching speed.

SUMMARY OF THE INVENTION

According to one embodiment of the invention, a digital to analog converter for converting a digital signal to an analog optical signal includes a light source and a plurality optical switches. Each optical switch is responsive to a respective one of a plurality of bits of a digital signal to selectively allow transmission of light from the light source through the switch. The digital to analog converter also includes a light combination system operable to combine the light passed through each of the switches and produce an analog optical signal indicative of the digital signal.

Some embodiments of the invention may provide numerous technical advantages. According to one embodiment, a digital to analog converter is provided that allows very fast, very low noise digital to analog conversion. Such a converter may have broad application in ground-based, ship-borne, and airborne RF systems that must distribute RF information on optical fibers, such as photonic phased array systems.

Additional technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF EXAMPLE EMBODIMENTS OF THE INVENTION

Embodiments of the present invention and its advantages are best understood by referring to FIGS. 1 through 5E of the drawings, like numerals being used for like and corresponding parts of the various drawings.

Figure 1:
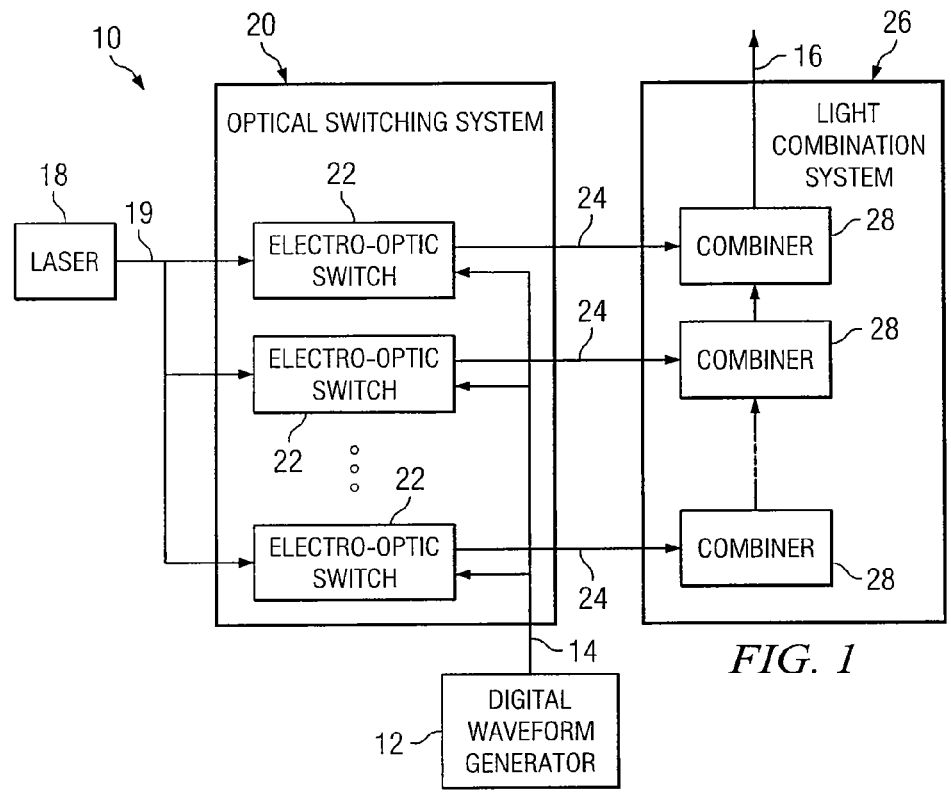
FIG. 1 is a block diagram illustrating an example digital to analog converter according to the teachings of the invention.

FIG. 1 is a block diagram illustrating a digital to analog converter 10 according to the teachings of the invention. Digital to analog converter 10 receives an electrical digital input signal over lines 14, which may be generated by a digital waveform generator 12, and produces an optical analog output at 16. Lines 14 may be any suitable transmission medium, such as an electrical conductor, that can carry a digital signal. Digital waveform generator 12 may be any suitable waveform generator operable to generate a digital signal. Alternatively, digital to analog converter 10 may receive a digital signal from some other source. Digital to analog converter 10 includes, in this embodiment, a light source 18, which in this example is a continuous wave laser light source; however, other light sources may be used. Laser light source 18 provides light to an optical switching system 20.

Optical switching system 20 includes, in this embodiment, a plurality of electro-optic switches 22. Each electro-optic switch 22 selectively blocks or passes light received from laser 18 over light paths 19 to a light combination system 26 over respective paths 24. Light paths 19 may be waveguide or other suitable medium for carrying a light signal. Each electro-optic switch 22 is responsive to a bit of electrical data received over lines 14 with all such bits collectively corresponding to the digital input signal generated by digital waveform generator 12. Thus, each electro-optic switch responds to one bit of the input digital signal. The output of optical switching system 20 is a plurality of light signals indicative of the respective bits of the input digital signal. For example, a digital bit of "zero" may correspond to preventing light from passing through the corresponding electro-optic switch while a digital bit of "one" may correspond to allowing light to pass-through the switch. These light signals are provided through paths 24 to light combination system 26. Paths 24 may be waveguides or any other suitable medium for carrying light, and in one example are formed as a part of combiners 28. Suitable examples of electro-optic switches 22 include polymeric absorption modulators, which are well-known in the art, as well as particularly fast electro-optic switches, such as those described below in conjunction with FIGS. 4-5E; however, any electro-optic switch may be used that exhibits desirable speed and settling characteristics, which are based on the particular application and are a function of signal frequency and the number of bits in the digital signal.

Figure 2A:
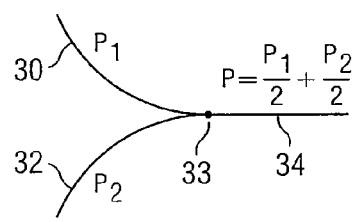
FIG. 2A is a schematic drawing illustrating the combination of two optical signals and the resulting output signal.
Figure 2B:
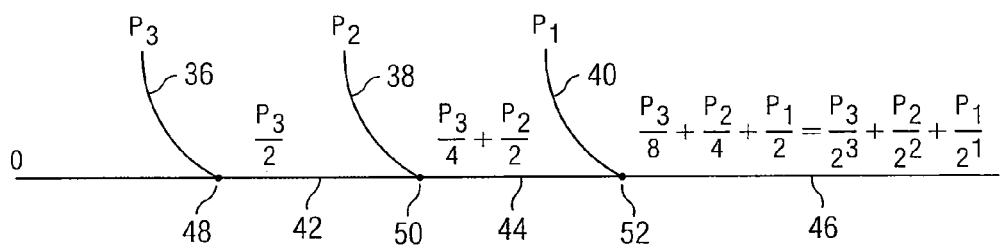
FIG. 2B is a schematic diagram illustrating the combination of a plurality of optical signals and the resulting output signal.

Light combination system 26 comprises a plurality of light combiners 28. In one example, light combiners 28 are merely waveguides each having the same attenuation; however, light combiners 20 may be any suitable device that can combine two beams of light with a desired attenuation. The teachings of the invention recognize that providing combiners 28 with an attenuation of 50%, or a gain of approximately 3 dB, and then adding the outputs of each combiner 28 in series is analogous to an "R-2R" electrical digital to analog converter. Thus, in this embodiment, each combiner 28 has a gain of approximately 3 dB and provides its output to the adjacent combiner 28. The result is that light combination system 26 generates an optical analog output at 16 that is indicative of the digital input signal provided at line 14. As described in greater detail below in conjunction with FIGS. 2A and 2B, the combiner 28 closest to analog optical output 16 receives a light signal that corresponds to the most significant bit of the digital input signal and the combiner 28 farthest from optical analog output 16 receives a light signal corresponding to the least significant bit of the digital input signal. By providing an attenuation of 50% at each combiner 28, light combination system 26 appropriately weights each bit of the received light signals over paths 24 such any given light signal represents a level that is a factor of two greater or less than the output from adjacent electro-optic switches 22, and this can match the binary nature of the digital input signal. Thus, the resulting sum at optical analog output 16 is indicative of the digital input signal, as described in greater detail below in conjunction with FIGS. 2A and 2B FIG. 2A is a schematic diagram illustrating how the light combination system 26 may appropriately combine light signals to be representative of the digital input signal. FIG. 2A shows the combination of two light signals and the resulting light signal. The teachings of the invention recognize that a light combination system, such as light combination system 26, may be constructed on path 24 that receives a plurality of light signals each corresponding to a respective bit of a digital signal, and add together the plurality of signals by successfully attenuating each received signal by a factor of 50%. The resulting signal is a combined sum that is representative of the digital input signal. The attenuation factor of 50% provides a power of two relationships that match the power of two relationship inherent in digital signals.

In FIG. 2A a light signal 30 having a power level P1 and a light signal 32 having a power level P2 are combined at 33. This combination may occur through merging two waveguides of equal size or through other suitable techniques. The resulting light signal 34 has a power level that is equal to the sum of half of each of the input signals 30 and 32. This technique may be expanded, as illustrated in FIG. 2B, to provide an optical combiner that successfully attenuates signals by a factor of two, providing the a power of two relationship desirable for converting digital input signals to analog signals.

In FIG. 2B input light signals 36, 38, and 40 are successfully combined to produce an output signal 46. Light signal 36 has a power level P3, light signal 38 has a power level P2, and light signal 40 has a power level P1. Light signal 36 is combined with no signal at combiner 48 resulting in a output light signal 42 having a power level P3/2. Output signal 42 is combined with light signal 38 at node 50 resulting in a light signal 44 having a power level of P3/4+P2/2. Light signal 44 is then combined with light signal 40 at node 52 resulting in a light signal 46 having a power of P3/8+P2/4+P1/2. Thus, it can be seen that successive combinations of light signals can result in power magnitudes corresponding to powers of two, which is useful in converting a digital signal to an analog signal. As described above, combinations at nodes 48, 50, and 52 may occur through simply combining two waveguides having equal attenuation, or through other suitable techniques. However, to obtain the desirable power of two relationship, it is desired that each optical combiner 28 have a attenuation factor of approximately 50%, or a gain of approximately 3 dB.

Thus, optical combination system 26 can receive a plurality of light signals each corresponding to a respective bit of a digital input signal and provide a proper weighting factor to result in an optical analog output that is representative of the overall value of the digital input signal.

Figure 3:
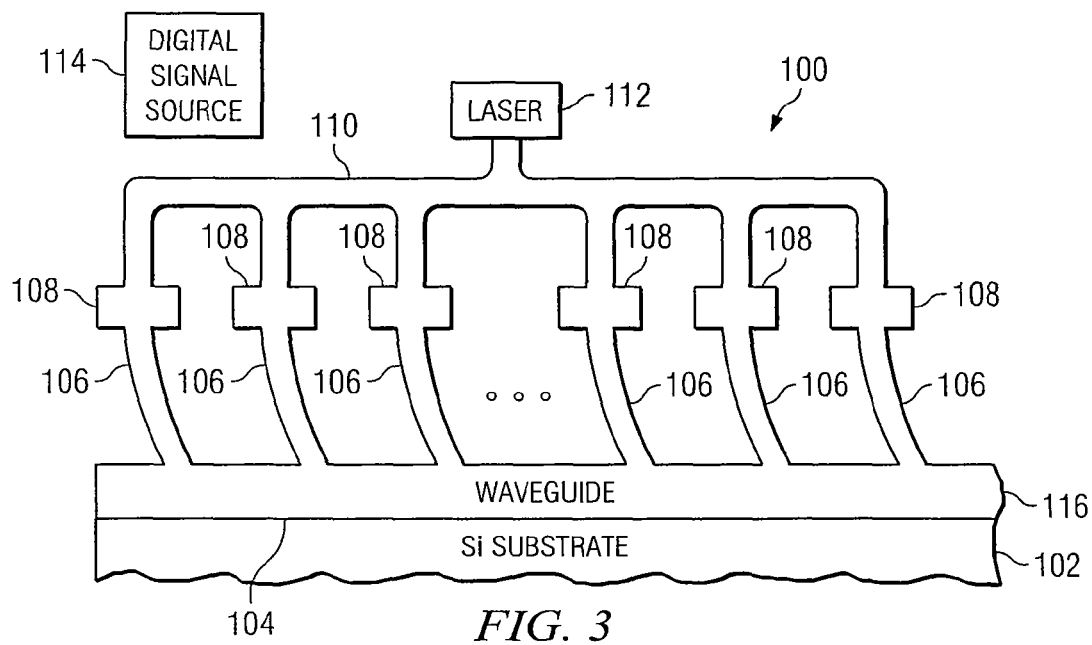
FIG. 3 is a schematic diagram illustrating an example embodiment of the digital to analog converter of FIG. 3 implemented on a semiconductor chip.

In one embodiment, the digital to analog converter 10 may be implemented with a waveguide on a semiconductor chip, as illustrated in FIG. 3. FIG. 3 is a schematic representation of a digital to analog converter formed on a semiconductor chip 100 according to the teachings of the invention. As illustrated, digital to analog converter 100 includes a silicon substrate 102, a wave guide 104, a plurality of input wave guides 106, a plurality of electro-optic switches 108, a "star coupler 110", and a laser 112. Connection of the electro-optic switches 108 to a digital signal source 114 is also shown in FIG. 3.

The operation of digital to analog converter 100 is analogous to digital to analog converter 10, described above in conjunction with FIGS. 1-2B. As shown, each of the electro-optic switches 108 corresponds to a respective bit of a digital input signal provided by digital signal source 114, selectively allowing light from laser 112 received through the star coupler 110 to pass to wave guide 104 through waveguides 106. Combination of light passed through from electro-optic switches 108 into waveguide 104 produces an output at 116 representative of the signal provided by digital signal source 114.

Wave guide 104 may be formed by thermally growing silicon oxide on silicon substrate 102 and etching away the oxide to form a silicon oxide strip. The dimensions of the silicon oxide strip may be selected to be suitable as a wave guide. The resulting silicon oxide strip represents the core of the wave guide and the surrounding air can be served as the cladding. In one example, electro-optic switches 108 are polymeric absorption modulators, whose absorption varies with voltage and which are well known in the art.

In one particular embodiment, it may be desirable that digital to analog converter 10 have the capability of converting a 12 bit digital signal in the gigahertz range to an optical analog output signal. In particular, one embodiment involves a 12 bit, 12.5 GHz digital to analog converter with a 70 dB spurious free dynamic range. In such a case, the switching speed of the electro-optic switches 22 should be very fast, and in particular, should have a settling time on the order of a few picoseconds for best performance. Desirable characteristics of an electro-optic switch suitable for such an application is illustrated and described in greater detail below in conjunction with FIG. 4 and an example switch is described with reference to FIGS. 5A through 5E.

To date, high speed optical modulators have been implemented primarily using the quantum-confined Stark effect. This type of technique has been demonstrated to operate for bit rates of 1 gigabit per second using a data generator and GaAs/AlGaAs quantum-confined Stark effect modulators. Through modifications and device design and system architecture, this technique may be extended to 10 gigabit per second. Such devices operating in optical frequencies rely on intraband transitions, with the associated nanosecond relaxation lifetimes.

Figure 4:
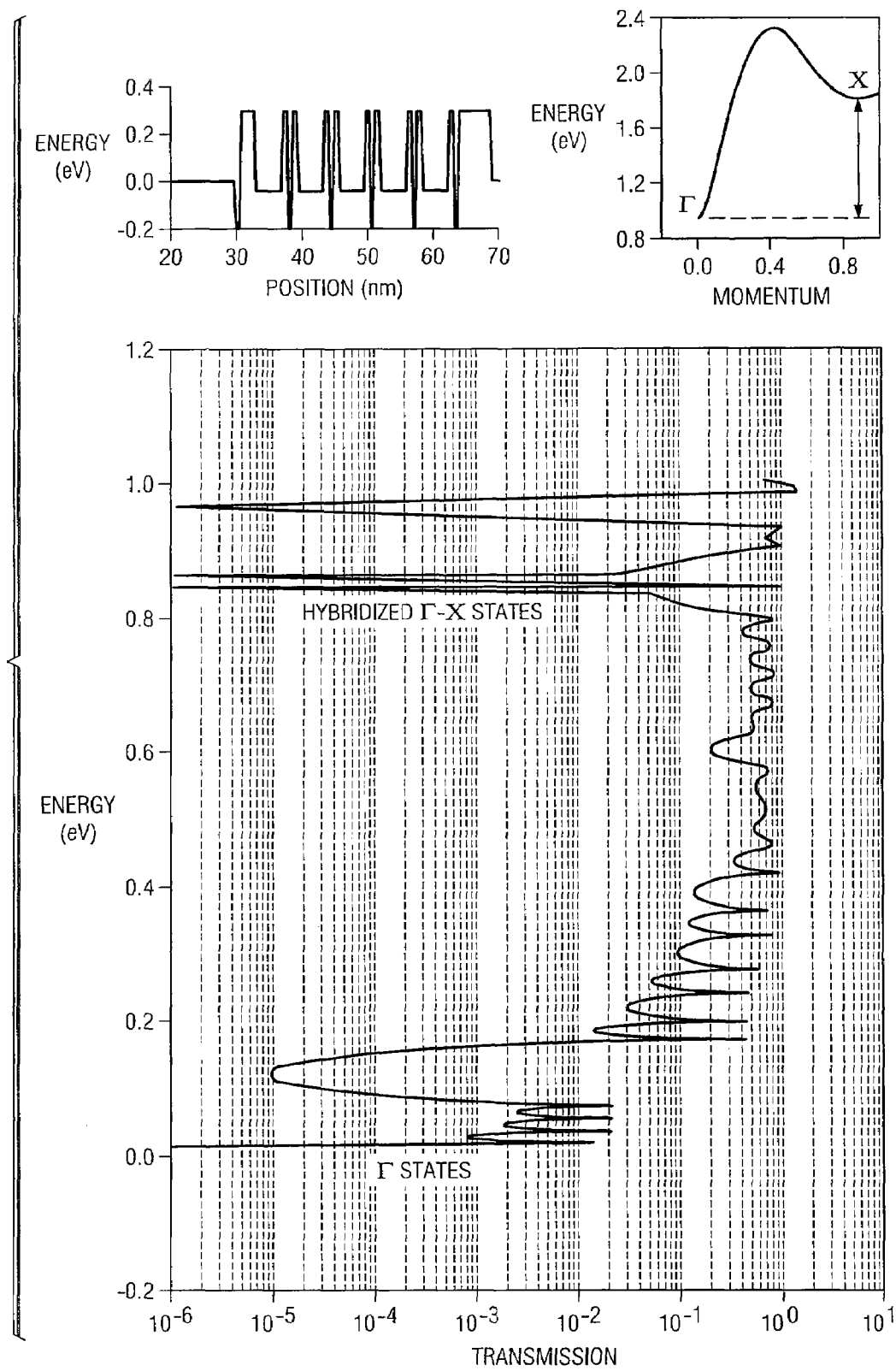
FIG. 4 illustrates characteristics of an electro-optic switch that may be suitable for certain embodiments of the invention.

In contrast, the electro-optic switch described below, relying on intraband transitions with picosecond lifetimes, provides a potential 100-1,000 times enhancement in speed, promising large signal switching speeds of 100 GHz or faster. The teachings of the invention recognize that intraband quantum-well electro-optic devices have injected carrier lifetimes on the order of picoseconds. Intraband quantum-well optical sources and detectors operate in the mid-infrared region of the spectrum and are incompatible with low-loss fiber optics in lasers used in the 1.3 to 1.55 µm wavelength band. The corresponding engines, 0.8 through 0.9 eV, are larger than the efficient intra-valley optical transitions of any quantum-well structure. However, optical transitions in Indium Phosphide (InP) normally forbidden by selection rules, become allowed in quantum-combined structures such as superlattices. Transitions between the Γ valley and the X valley fall in the 0.8-0.9 energy range for Indium Phosphide and Indium Phosphide-lattice-matched materials. Characteristics of a multi-quantum well structure exhibiting this transition is shown in FIG. 4. FIG. 4 illustrates the characteristics for an electro-optic switch based on a superlattice structure based on InP, $In_{0.53}Ga_{0.32}Al_{0.15}As$, $In_{0.52}Al_{0.48}As$, and $In_{0.53}Ga_{0.47}As$. The calculated electron transmission probability is plotted to the right. Strong luminescence has been observed from the Γ-X transition between quantum wells X states and the conduction band in hole states in the valence band. This transition may be exploited for providing a fast, high contrast, electrical-optic switch.

Several criteria may be considered in constructing such an electro-optic switch. These include on-off contrasts, absorption energy and speed. The on-off contrast of an optical signal is determined by several factors. The transmitted optical power is proportional to $e^{-\alpha L}$ where $\alpha$ is the absorption coefficient and L is the length. The absorption coefficient is proportional to the electron density in the lowest bands of states, $\rho_1$, and the optical matrix elements squared between the lowest band of states and the first band of Γ-X states. The absorption coefficient is modulated by electrically varying $\rho_1$. A specified contrast of 80 dB requires $(\alpha_{max}-\alpha_0)L=18.42$ where $\alpha_\beta$ is the maximum absorption corresponding to the minimum $n_1$ and any background absorption. To maximize $\alpha_{max}$ and minimize L requires a good modulation of $\rho_1$ and good optical coupling between the lowest Γ state and the band of hyberdized X states. Thus, the on-off contrast can be enhanced both by maximizing the electron density modulation at the lowest set of electron states and by maximizing the optical coupling matrix element. This maximization may be performed through any suitable technique. In one particular implementation the maximization is performed by using a Nano Electrode Engineering Modeling Tool, which is a design tool that can efficiently explore the design space of materials, geometry, bias and doping.

Tuning the optical absorption energy to a common (1.3 µm/1.55 µm) laser requires control of the Γ-X energy separation. For these materials the relative position of the X value is not well known and a range of values can be found in the literature. However, the absorption coefficients versus the wave length can be measured based on a constructed device with measured data then used to optimize the device.

The speed of the optical switch is determined by how fast electrons can be swept into and out of the multiple quantum well structure. Electrically, the device operates as a capacitor with a thick collector barrier acting as a dielectric. As the voltage of the left contact is swept up and down, electrons are injected and removed from the quantum wells. In one embodiment, the barriers should be designed such that the tunneling probability into the left contact results in a tunneling time of approximately of approximately one picosecond for the quantum well states. Any electrons optically injected into the X states have a relaxation lifetime on the order of picoseconds. These lifetimes imply an intrinsic device bandwidth in the range of 500 GHz. Device switching speed is determined solely by the RC time constants of the circuit. The device link and power consumption can be minimized by maximizing the absorption coefficient as described above.

With the above considerations in mind, one example electro-optic switch suitable for input signals in the gigahertz range is illustrated below with reference to FIGS. 5A through 5E.

Figure 5A:
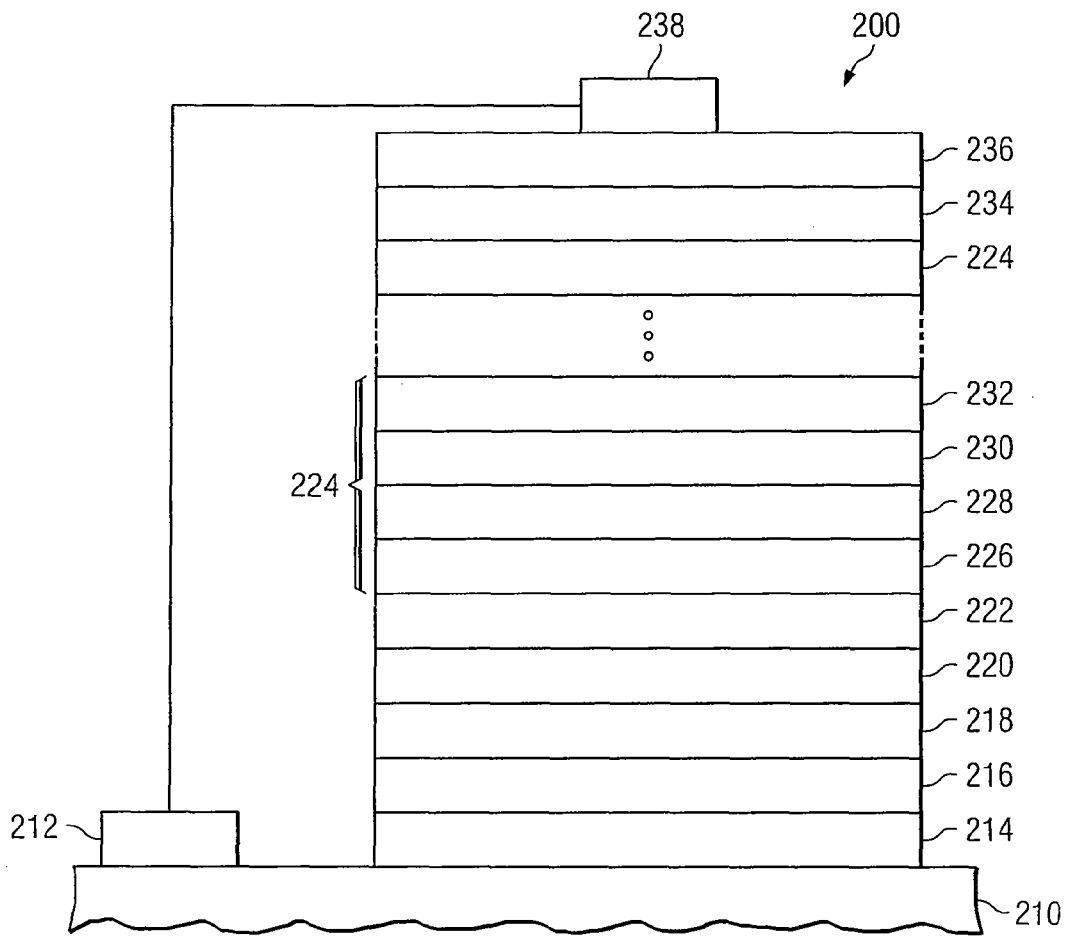
FIG. 5A is a cross-sectional diagram illustrating one example of the electro-optic switch of FIG. 1.

FIG. 5A illustrates a cross-sectional diagram of one example of a high-speed electro-absorption modulator suitable for use as an electro-optic switch with the present invention. Modulator 200 may be formed as a semiconductor device as illustrated in FIG. 5A. Modulator 200 may include a metal Schottky contact 212 formed overlying a silicon substrate 210. Formed overlying substrate 210 is a layer 214 of InGaAs. One suitable thickness for layer 214 is four monolayers, and one suitable doping for layer 214 is 1e19 $cm^{-3}$. Overlying layer 214 is a layer 216 of intrinsic AlAs. One example of a suitable thickness for layer 214 is six monolayers. Overlying layer 216 is a layer 218 of intrinsic InAlAs. One example suitable thickness for layer 218 is 15 nm. Overlying layer 218 is a layer 220 of InGaAs. One example thickness of layer InGaAs is 3 ml, and one example doping is 1e17 $cm^{-3}$. Overlying layer 220 is a layer 222 of InAlAs. One example thickness of layer 222 is three monolayers, and one example doping is 1e17 $cm^{-3}$.

Overlying layer is a plurality of repetitions of epilayers 224 having a grading doping from 5e17 $cm^{-3}$ to 1e17 $cm^{-3}$. Any suitable number of epilayers 224 may be used; however, in one embodiment, eight epilayers 224 are used. Epilayer 224 is formed with a layer 226 of InP. One example thickness for layer 226 is 4.1 µnm, and one example doping is 5e17 $cm^{-3}$. Overlying layer 226 is a layer 228 of InAlAs. One example thickness for layer 228 is three monolayers, and one example doping level is 5e17 $cm^{-3}$. Overlying layer 228 is a layer 230 of InAlAs. One example thickness of layer 230 is three monolayers, and one example doping level is 5e17 $cm^{-3}$. Overlying layer 230 is a layer 232 of InAlAs. One example thickness of layer 232 is three monolayers, and one example doping is 5e17 $cm^{-3}$.

Overlying the last epilayer 224 is a layer 234 of $In_{0.53}Al_xGa_{(0.47-x)}As$, where x is graded from 0 to 0.1. An example thickness for layer 234 is 50 nm, and one example doping is 2e17 $cm^{-3}$. Overlying layer 234 is a layer 236 of InGaAs. One example thickness for layer 236 is 5 nm, and one example doping is 1e19 $cm^{-3}$. Overlying layer 236 is a metal non-alloy contact 238. The above layers may be found through techniques well known in the art or through other suitable technologies.

Figure 5B:
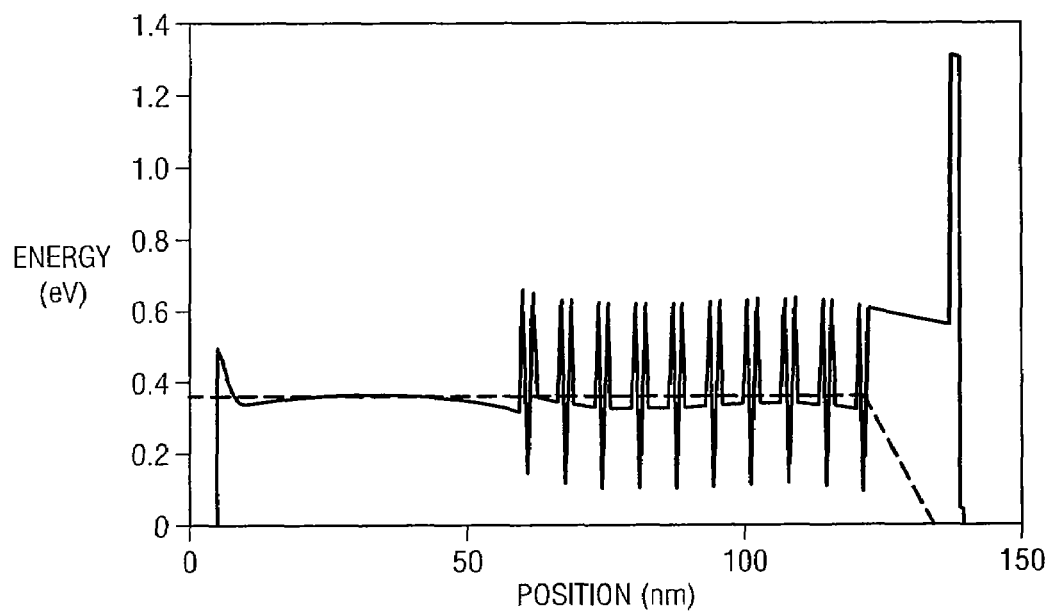
FIG. 5B is a graph illustrating simulation results for the electro-optic switch of FIG. 5A, showing a band diagram corresponding to the absorbing state.
Figure 5C:
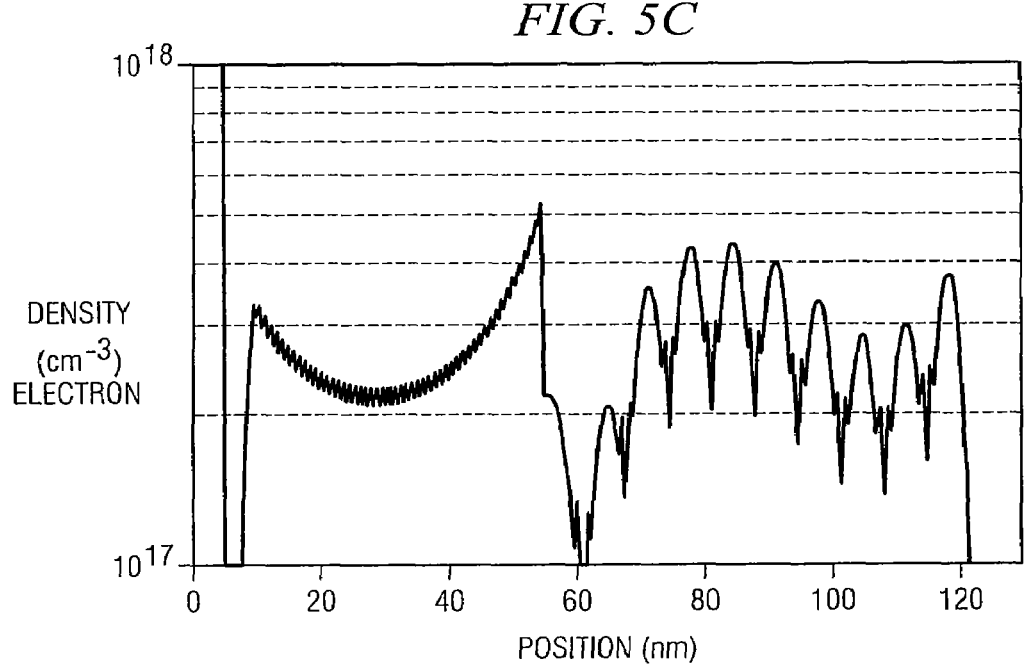
FIG. 5C is a graph illustrating simulation results for the electro-optic switch of FIG. 5A, showing a charge distribution corresponding to the absorbing state.
Figure 5D:
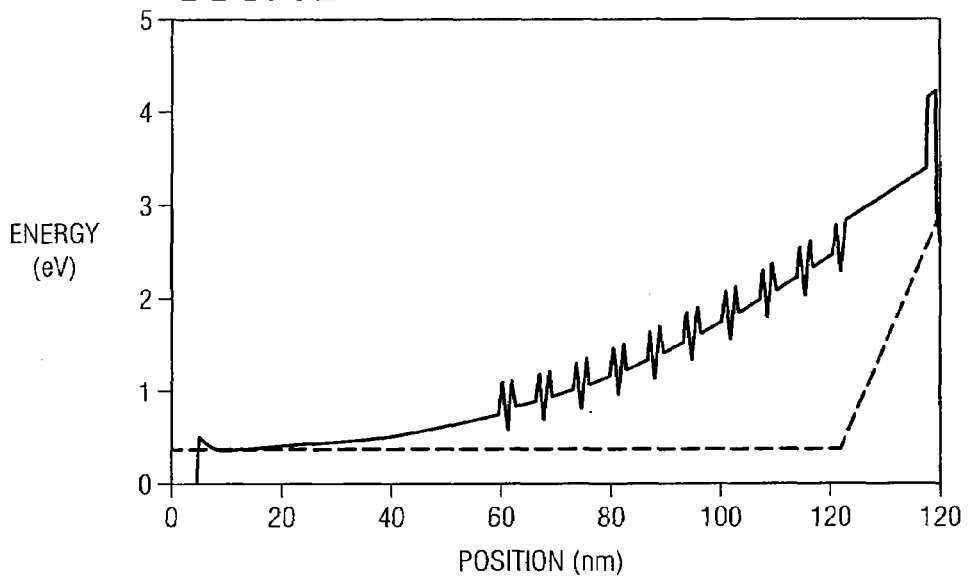
FIG. 5D is a graph illustrating simulation results for the electro-optic switch of FIG. 5A, showing a band diagram corresponding to a transparent state.
Figure 5E:
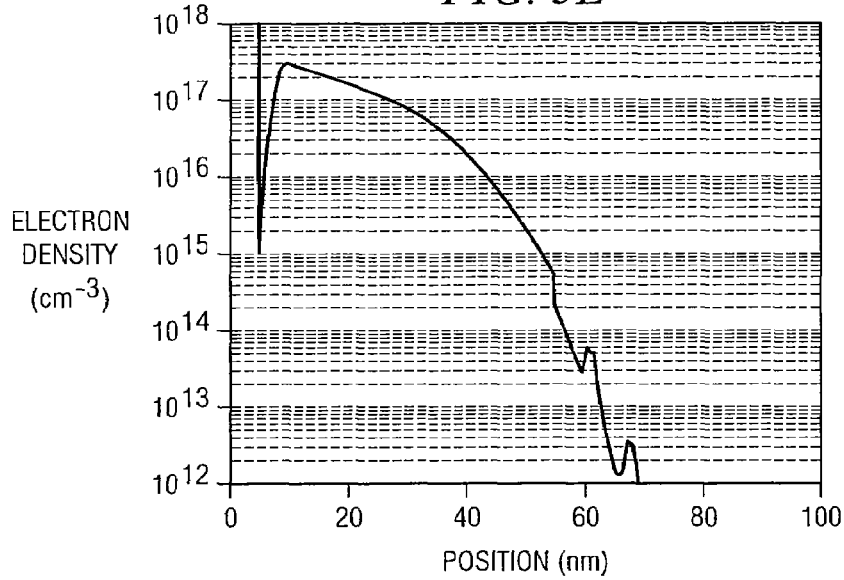
FIG. 5E is a graph illustrating simulation results for the electro-optic switch of FIG. 5A, showing a charge distribution corresponding to the transparent state.

FIG. 5B illustrate simulation results for modulator 200 with eight epilayers 224. FIG. 5B is a band diagram of Γ valley minimums at V=0.5 volts, corresponding to the absorbing state. FIG. 5C shows the corresponding charge distribution. As illustrated, the electron density in the superlattice, the optically active region, is between $2\text{-}4\times10$ cm$^{-3}$. FIG. 5D illustrates a band diagram of Γ valley minimums at V=−2.5 volts, corresponding to the transparent state. FIG. 5E shows the corresponding charge distribution for the transparent state. The electron density in the superlattice, the optically active region, is less than $10^{-14}$ cm$^{-3}$. The ratio of the electron density and the absorbing state and transparent state is larger than 3,000. This corresponds to the on-off ratio of the absorption coefficient.

Figure 6:
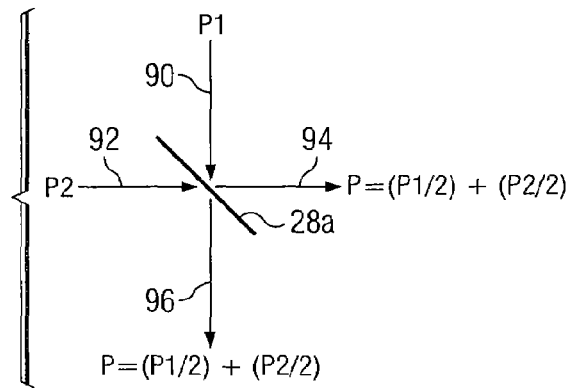
FIG. 6 is a schematic diagram illustrating an example embodiment of a combiner that may be implemented by the digital to analog converter of FIG. 1.

FIG. 6 shows one embodiment of a combiner 28a that may be implemented with the digital to analog converter 10. In this particular embodiment, combiner 28a is an optical beam splitter element; however, it should be appreciated that any suitable type of combiner 28 may be utilized with the teachings of the present disclosure. In operation, optical ray P1 90 and optical ray P2 92 may each be partially attenuated so that 50% of the optical energy is transmitted without deviation to optical ray 94. Optical ray P1 90 impinges upon the combiner 28a so that 50% of its optical energy is reflected into optical ray 94. Optical ray P2 92 impinges upon the combiner 28a so that that 50% of the optical energy is transmitted without deviation into combined optical ray 94. Optical ray 96 represents energy not needed in the combining element and is discarded. The output optical ray 94 from this combiner 28a may be fed to another combiner (not specifically shown) in a sequence of combiners, or may be the optical analog output 18.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An optical digital to analog converter for converting a digital signal to an analog optical signal comprising:
    a laser;
    a plurality of optical switches each responsive to a respective one of a plurality of bits of the digital signal to selectively transmit light from the laser, wherein the plurality of optical switches comprises a plurality of intraband quantum-well absorbers that operate with optical transitions between a lower mini-band of Γ states and an upper mini-band of a mixture of both Γ states and X states; and
    a plurality of light combiners connected in a one-to-one fashion with the optical switches and each having a gain of approximately 3 dB, receiving any light transmitted by the respective optical switch, and providing a respective output signal, the plurality of light combiners arranged in series such that the output of a last light combiner in the series is indicative of the digital signal.

2. An optical digital to analog converter for converting a digital signal to an analog optical signal comprising:
    a light source;
    a plurality of optical switches each responsive to a respective one of a plurality of bits of the digital signal to selectively allow transmission of light from the light source through the switch, wherein the plurality of optical switches comprises a plurality of intraband quantum-well absorbers that operate with optical transitions between a lower mini-band of Γ states and an upper mini-band of a mixture of both Γ states and X states; and
    a light combination system operable to combine the light passed through each of the switches and produce an analog optical signal indicative of the digital signal.

3. The converter of claim 2, wherein the light combination system comprises a plurality of light combiners each coupled to a respective one of the optical switches and having a gain of approximately 3 dB.

4. The converter of claim 3, wherein each of the light combiners comprises a waveguide having the same attenuation as each of the other of the plurality of waveguides.

5. The converter of claim 3, wherein the plurality of optical combiners are coupled together in series.

6. The converter of claim 3, wherein the plurality of optical combiners comprise twelve optical combiners.

7. The converter of claim 2, wherein the plurality of optical switches comprises at least one optical switch having a setting time less than ten picoseconds.

8. The converter of claim 2, wherein the plurality of intraband quantum-well absorbers operate with optical transitions in Indium Phosphide.

9. The converter of claim 2, wherein the light source comprises at least one laser.

10. A method for converting a digital signal to an analog optical signal comprising:
    selectively allowing light to pass through respective ones of a plurality of optical switches based at least in part on the digital signal, the digital signal having a plurality of bits associated with respective ones of the plurality of optical switches, wherein the plurality of optical switches comprises a plurality of intraband quantum-well absorbers that operate with optical transitions between a lower mini-band of Γ states and an upper mini-band of a mixture of both Γ states and X states; and
    combining the light passing through respective ones of the plurality of optical switches such that the combined light is representative of the digital signal.

11. The method of claim 10, wherein combining the light comprises providing an output of each optical switch to a respective optical combiner, the plurality of optical combiners connected in series, each optical combiner having a gain of approximately 3 dB.

12. The method of claim 11, wherein providing an output of each optical switch to a respective optical combiner comprises providing an output of each optical switch to a respective optical beam splitter element.

13. The method of claim 11, wherein the digital signal comprises twelve bits and the plurality of optical combiners comprises twelve optical combiners.

14. The method of claim 10, wherein selectively allowing light to pass comprises selectively allowing laser light to pass.

15. The method of claim 10, wherein the plurality of optical switches comprises at least one optical switch having a setting time less than ten picoseconds.

16. The method of claim 10, wherein the plurality of optical switches operate with transitions in Indium Phosphide.

* * * * *